United States Patent
Londiche et al.

(10) Patent No.: US 9,370,986 B2
(45) Date of Patent: Jun. 21, 2016

(54) AIR OUTLET FOR A VEHICLE

(71) Applicant: FAURECIA INNENRAUM SYSTEME GmbH, Hagenbach (DE)

(72) Inventors: Stephane Londiche, Montmagny (FR); Volker Doll, Ranschbach (DE)

(73) Assignee: FAURECIA INNENRAUM SYSTEME GmbH, Hagenbach (DE)

(*) Notice: Subject to any disclaimer, the term of this patent is extended or adjusted under 35 U.S.C. 154(b) by 0 days.

(21) Appl. No.: 14/620,868

(22) Filed: Feb. 12, 2015

(65) Prior Publication Data

US 2015/0239325 A1  Aug. 27, 2015

(30) Foreign Application Priority Data

Feb. 26, 2014  (DE) .......................... 10 2014 203 511

(51) Int. Cl.
*B60H 1/34* (2006.01)
*B60K 37/00* (2006.01)

(52) U.S. Cl.
CPC ............ *B60H 1/3421* (2013.01); *B60H 1/3428* (2013.01); *B60K 37/00* (2013.01); *B60H 2001/3471* (2013.01)

(58) Field of Classification Search
CPC ...... B60H 1/241; B60H 1/245; B60H 1/3414; B60H 1/3421; B60H 1/3428
USPC ...................................................... 454/155
See application file for complete search history.

(56) References Cited

U.S. PATENT DOCUMENTS

| | | | | |
|---|---|---|---|---|
| 3,602,127 A | * | 8/1971 | Walker .................. | B60H 1/3428 454/316 |
| 7,455,581 B2 | * | 11/2008 | Gehring ............... | B60H 1/3428 454/155 |
| 2002/0081965 A1 | | 6/2002 | Demerath et al. | |
| 2004/0127153 A1 | * | 7/2004 | Demerath ............ | B60H 1/3421 454/155 |
| 2008/0171509 A1 | * | 7/2008 | Grossmann ........ | B60H 1/00871 454/155 |

FOREIGN PATENT DOCUMENTS

| | | |
|---|---|---|
| DE | 10 2009 051 075 | 5/2001 |
| DE | 10 226 441 | 3/2004 |
| DE | 10 2007 034 108 | 8/2008 |
| DE | 20 2013 100 257 | 3/2013 |

OTHER PUBLICATIONS

German Patent and Trademark Office, Office Action, DE 10 2014 203 511.2, Sep. 5, 2014.

* cited by examiner

*Primary Examiner* — Helena Kosanovic
(74) *Attorney, Agent, or Firm* — Leveque Intellectual Property Law, P.C.

(57) ABSTRACT

The invention relates to an air outlet comprising a housing, an operating element arranged on the visible side of the air outlet, a first air-guiding element and a closure element, wherein the operating element has a handle and a lever-like rotary element, wherein the pivot point of the rotary element is arranged on the handle, wherein the rotary element is mechanically coupled to the closure element via a first coupling in order to adjust the intensity of the air that can flow out from the air outlet, wherein the handle can be moved in a first direction and is mechanically coupled to the first air-guiding element via a second coupling in order to adjust the outflow direction of the air that can flow out from the air outlet, wherein the outflow direction lies in a first plane having the first direction, wherein the first coupling is operatively connected to a first lever, wherein the pivot point of the first lever is arranged on the second coupling, wherein the second coupling has a second lever, wherein the pivot point of the second lever is arranged on the air outlet in a manner fixed on the housing.

21 Claims, 3 Drawing Sheets

AIR OUTLET FOR A VEHICLE

PRIORITY CLAIM

This application claims benefit of foreign priority in accordance with 35 U.S.C. 119(b) to German application No. 10 2014 203 511.2 filed Feb. 26, 2014.

BACKGROUND

The disclosure relates to an air outlet for a vehicle and also to an instrument panel for a motor vehicle.

Air outlets are used in vehicles in order to supply air to the passenger compartment of the vehicles. A vehicle passenger can operate the air outlet in order to guide the air flowing out in different directions. The airflow intensity can also be controlled.

By way of example, DE 102 26 441 B3 discloses a ventilation device comprising an outlet. This has a joystick for adjusting the ventilation direction in the horizontal and vertical direction via a lamella position. A further outlet is known from US 2002/0081965 A1 and DE 20 2013 100 257 U1.

SUMMARY

An object of the invention is to create an improved air outlet and an instrument panel comprising such an air outlet.

The objects forming the basis of the invention are achieved with the features of the independent patent claims. Preferred embodiments of the invention are specified in the dependent patent claims.

An air outlet is specified that comprises a housing, an operating element arranged on the visible side of the air outlet, a first air-guiding element and a closure element, wherein the operating element has a handle and a lever-like rotary element, wherein the pivot point of the rotary element is arranged on the handle, wherein the rotary element is mechanically coupled to the closure element via a first coupling in order to adjust the intensity of the air that can flow out from the air outlet, wherein the handle can be moved in a first direction and is mechanically coupled to the first air-guiding element via a second coupling in order to adjust the outflow direction of the air that can flow out from the air outlet, wherein the outflow direction lies in a first plane having the first direction, wherein the first coupling is operatively connected to a first lever, wherein the pivot point of the first lever is arranged on the second coupling, wherein the second coupling has a second lever, wherein the pivot point of the second lever is arranged on the air outlet in a manner fixed on the housing.

The air outlet can be used in a wide range of transport means, such as road vehicles, aircraft, watercraft or rail vehicles. Embodiments of the invention could have the advantage that all three areas of the air guidance (left, right, up, down) and opening/closing can be controlled at the same time by means of one operating element. The operation can be implemented with minimal expenditure of force due to the selection of the levers.

By moving the handle, for example in a plane (for example horizontally) to the left or to the right, the airflow direction is adjusted to the left or right. By rotating the rotary element likewise in this plane and relative to the handle, the intensity of the airflow is adjusted. If the handle is moved the rotary element is also forcibly moved, but without any resultant adjustment of the airflow.

In accordance with an embodiment of the invention the axis of rotation of the rotary element is perpendicular to the first direction.

In accordance with an embodiment of the invention the second coupling can be displaced in the first direction via the handle, wherein the second coupling and the handle are mechanically coupled to one another via a first axis pointing in the first direction and are rotatable relative to one another about the first axis. This could allow in particular an adjustment of the airflow direction in a plane perpendicular to the above-mentioned plane, that is to say vertically (up/down). However, when adjusting the airflow direction in this perpendicular plane, the airflow intensity is not influenced in spite of the integration of the rotary element provided for this purpose in the operating element or even in the handle. The handle and the first coupling are thus mechanically decoupled from one another in the direction of rotation about the first axis.

In accordance with an embodiment of the invention the first coupling and the first lever are mechanically coupled to one another via a first slotted link guide, wherein the first lever and the first coupling are rotatable relative to one another in the first slotted link guide. This could contribute to the fact that the movement of the rotary element does not mechanically influence the position of the handle and thus simplifies the operation.

In accordance with an embodiment of the invention the air outlet further comprises a force transmission element for mechanically coupling the first lever to the closure element, wherein the first lever and the mechanical coupling are mechanically decoupled from one another in the first direction. It could thus be possible that the operation of the handle and the operation of the rotary element do not influence one another. For example, the decoupling could be implemented via a slotted link guide extending in the first direction. In the case that the handle is displaced in the first direction, the first coupling and therefore the first lever are also displaced simultaneously likewise in the first direction. However, the force transmission element is only moved when the first lever is rotated relative to the second coupling by displacement or rotation of the rotary element relative to the handle.

In accordance with an embodiment of the invention the closure element can be rotated about a second axis pointing in the first direction in order to adjust the intensity of the air that can flow out from the air outlet, wherein the force transmission element is coupled to the closure element via a third lever, wherein the force transmission element and the third lever are mechanically coupled to one another via a second slotted link guide, wherein the third lever and the force transmission element can be rotated relative to one another in the second slotted link guide. This could allow the closure element to be accommodated in the air outlet in such a way that the closure element extends over the entire width of the air outlet. Nevertheless, a mechanically smooth-running adjustment possibility of the closure element could be enabled in turn via the use of the third lever. The closure element for example is a flat plate that can cover and close or release the air duct in the air outlet by pivoting about the second axis.

Two of the closure elements that have two of the second axes are preferably used. In this case, two of the third levers are also to be provided—one of the third levers for each closure element. In this case, the force transmission element is also V-shaped or T-shaped at the end thereof facing the third levers in order to thus enable the slotted link guide by means of the two ends of the V or T shape projecting symmetrically with respect to one another. To this end, the ends could have corresponding link slots (recesses), in which the third levers could be guided.

In accordance with an embodiment of the invention the first coupling is displaceable relative to the second coupling via a third slotted link guide guiding in the first direction, wherein the third slotted link guide is formed by the first coupling and by the second coupling. For example, the second coupling has a recess pointing in the first direction, in which recess a pin of the first coupling is guided as link block.

In accordance with an embodiment of the invention the first coupling and the rotary element are mechanically coupled to one another via a fourth slotted link guide, wherein the rotary element and the first coupling are rotatable relative to one another in the fourth slotted link guide. Here, the slotted link guide enables exclusively a transmission of force between the first coupling and the rotary element in the first direction. Due to the slotted link guide, a mechanical decoupling between the first coupling and rotary element takes place perpendicularly to the first direction.

In accordance with an embodiment of the invention the air outlet also comprises a second air-guiding element, wherein the handle is mounted on the housing so as to be rotatable about a handle axis, wherein the handle can be displaced in the first direction relative to the housing via the handle axis, wherein the handle axis points in the first direction, wherein the handle is mechanically coupled to the second air-guiding element via a third coupling in order to adjust the outflow direction of the air that can flow out from the air outlet, wherein the outflow direction adjustable via the second air-guiding element lies in a second plane having the direction of rotation of the handle axis. Due to the second air-guiding element, the outflow direction of the air in the second, for example vertical plane can be adjusted.

In accordance with an embodiment of the invention the third coupling and the handle are mechanically coupled to one another via a fifth slotted link guide, wherein the handle and the first coupling are rotatable relative to one another in the first slotted link guide. The associated axis of rotation in turn points in the first direction. For example, the third coupling has a fork, in which an axis of the handle pointing in the first direction is guided.

In accordance with an embodiment of the invention the third coupling is hinged to the second air-guiding element via a coupling axis, wherein the coupling axis points in the first direction.

In accordance with an embodiment the handle and the first coupling are mechanically decoupled from one another in the direction of rotation of the handle axis. As already mentioned above, the first axis is used for this purpose.

In a further aspect the invention relates to an instrument panel for a motor vehicle, wherein the instrument panel has an air outlet as described above.

It is clear that the above-described embodiments can be combined arbitrarily with one another, provided the combinations are not mutually exclusive.

Preferred embodiments of the invention will be explained hereinafter in greater detail on the basis of the drawings.

DESCRIPTION

Elements similar to one another will be denoted hereinafter by the same reference signs.

Figure 1:
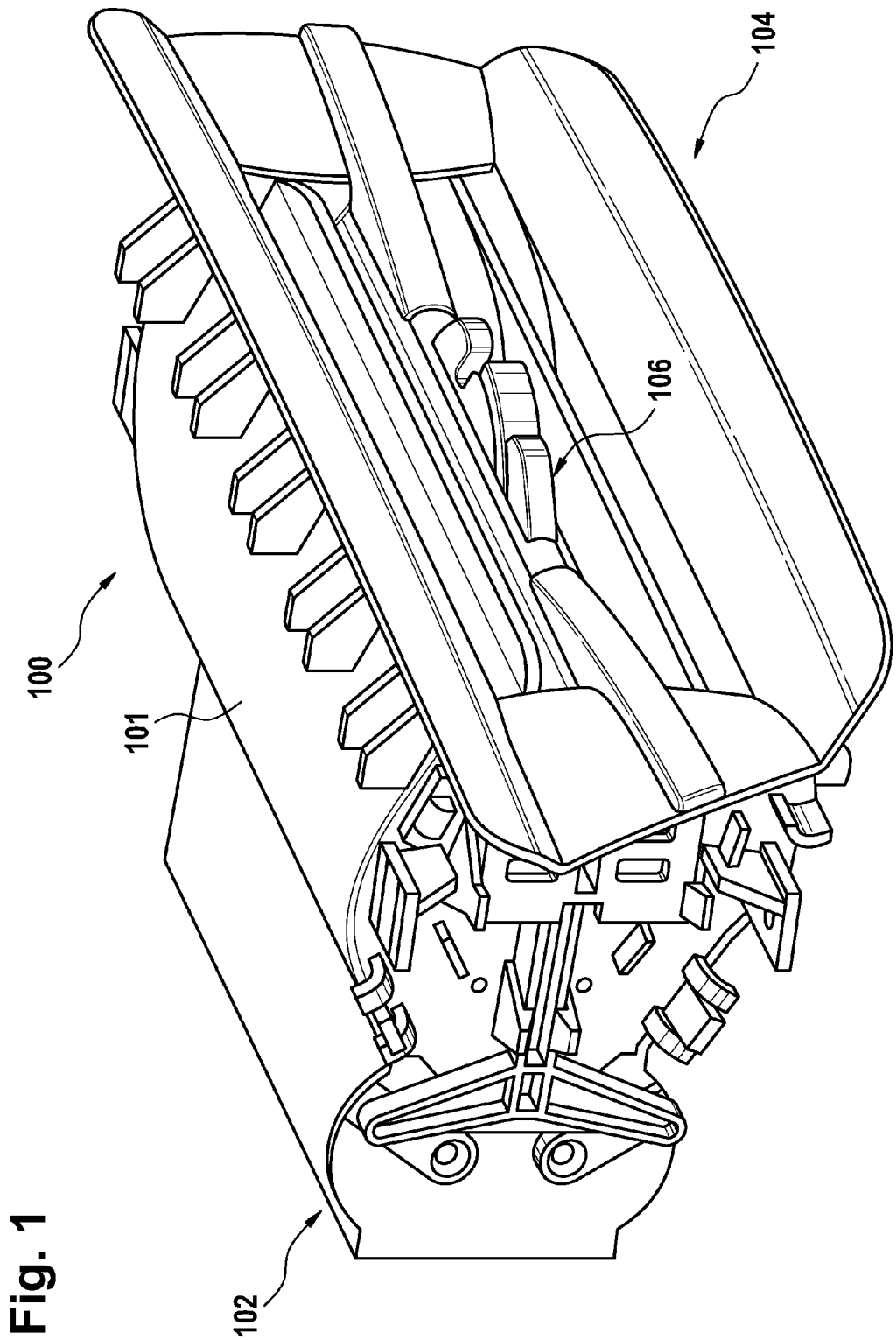
FIG. 1 shows a schematic perspective view of an air outlet.

FIG. 1 shows a schematic perspective view of an air outlet 100. The air outlet 100 has an air inlet side 102 and an air outlet side 104. Air flows towards the air inlet side 102 and into the air outlet 100, flows therethrough, and exits again on the air outlet side 104.

An operating element 106, by means of which the intensity of the airflow flowing out and also the airflow direction can be adjusted, is arranged on the air outlet side. Here, the airflow direction can be adjusted in the horizontal and vertical direction.

Figure 2:
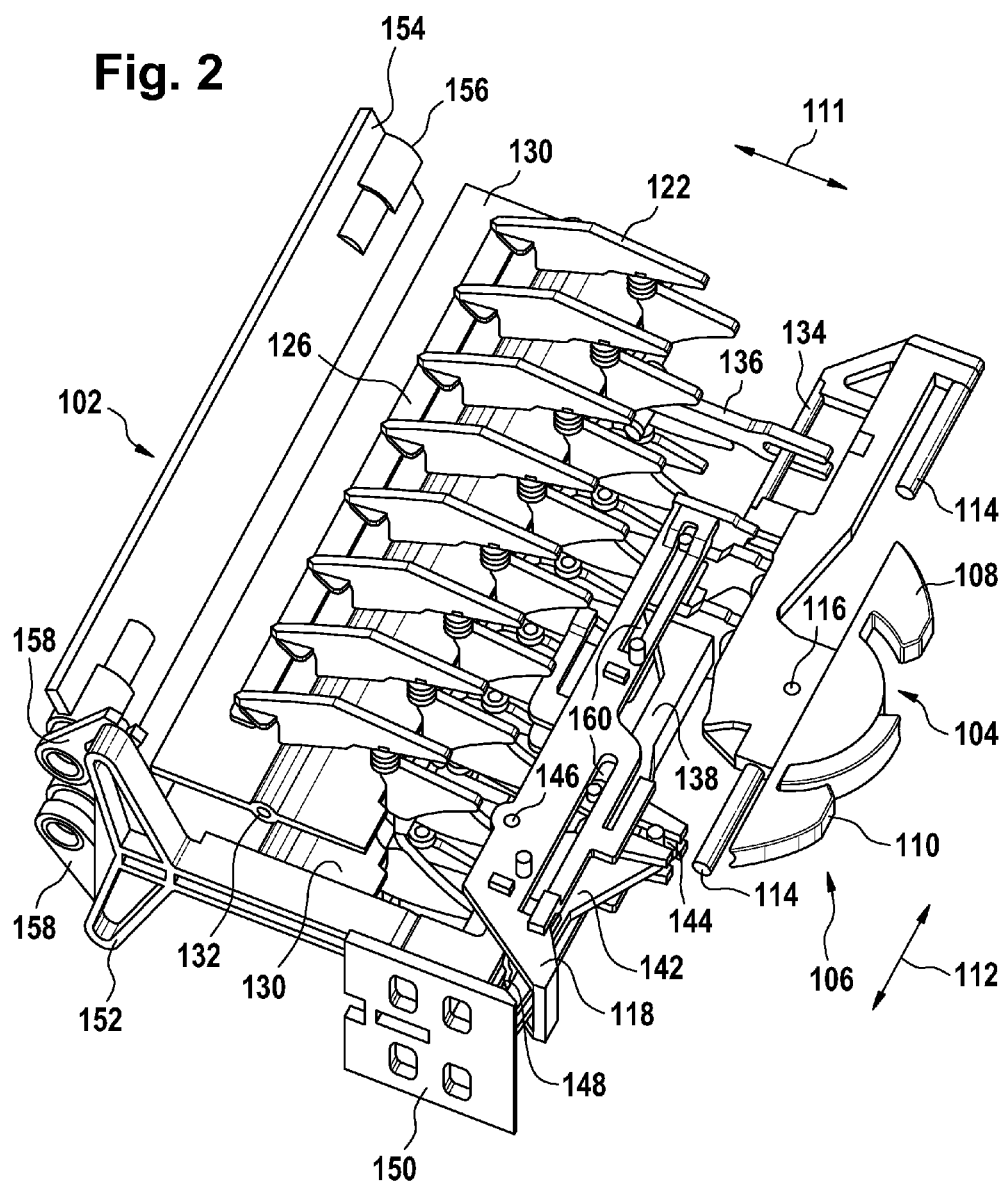
FIG. 2 shows a further perspective view of the air outlet of FIG. 1.

In FIG. 1 the air outlet 100 is surrounded by the housing 101 thereof. For the sake of clarity, the description is provided hereinafter with omission of the housing 101 in FIGS. 2 and 3. The following details relate both to FIG. 2 and to FIG. 3. In FIG. 2 the details here can be seen in a perspective view of the air outlet of FIG. 1, and in FIG. 3 the details can be seen in a plan view of the air outlet of FIG. 1 from above.

The operating element 106 located on the air outlet side 104 comprises a handle 108 and a rotary element 110. The rotary element 110 is mounted rotatably here on the handle 108. For this purpose, the handle 108 has the form of an elongate lever, wherein the pivot point 116 of this lever is provided on the handle 108.

The handle 108 can be displaced in the direction 112, that is to say in a horizontal direction, along the axes 114 thereof. As a result of a movement of the handle 108 to the left and to the right, a coupling 118 is also moved with the handle 108. This is achieved in that the handle 108 and the coupling 118 are mechanically coupled to one another via an axis 120 (illustrated merely schematically in FIG. 3) that also points in the direction 112. The handle 108 and the coupling 118 are rotatable here relative to one another about the axis 120. The handle 108 and the coupling 118 thus have a mechanical decoupling in the direction of rotation of the axis 120. Due to a movement of the handle 108 in the direction 112, the coupling 118 is by contrast also displaced to the left or to the right in accordance with the movement of the handle.

Air-guiding elements 122 in the housing 101 are used to guide the air flowing out from the air outlet to the left and to the right, that is to say in the horizontal direction. Here, the air outflow direction is adjusted in the horizontal direction via the air-guiding elements 122 by said displacement of the handle 108 in the direction 112. This is achieved via one of the air-guiding elements 122, which is denoted hereinafter by reference sign 124 and is referred to as a "lever". The lever 124 has a pivot point 128 fixed on the housing.

The lever 124 is connected to the coupling 118. A movement of the handle 108 to the left leads to the displacement of the coupling 118 likewise to the left. This in turn causes the lever 124 to rotate about the axis 128 in a clockwise direction. Since all further air-guiding elements 128 are now connected via a coupling rail 126 to the lever 124, the movement of the handle 108 to the left leads to a pivoting of all air-guiding elements 122 in a clockwise direction. Similarly, a displacement of the handle 108 to the right along the axis 114 leads to a rotation of all air-guiding elements 122 in an anticlockwise direction.

The airflow direction of the air exiting from the air outlet side 104 is adjusted in the vertical direction as follows: air-guiding elements 130 are arranged on the housing so as to be movable about axes 132 pointing in the direction 112. The rotation of the air-guiding elements 130 about the corresponding axes 132 leads to a guidance of the airflow downwards or upwards, that is to say in the vertical direction. This air guidance can also be adjusted via the handle 108.

The axes 114 are mounted rotatably on the housing for this purpose, and therefore a rotation of the handle 108 about these axes 114 causes the axis 134 of the handle to be pivoted in the housing. The air-guiding element 130 visible in FIG. 3 has a fork-shaped coupling 136, wherein the fork-shaped opening of this coupling 136 engages with the axis 134. Since the axis 134 is parallel to the axis 114, the axis 134 is moved upwards on account of a pivoting of the handle 108, for example downwards about the axis 114. Due to the upwards movement of the axis 134, the coupling connected rigidly to the air-guiding element 130 is also moved upwards via the fork-shaped end thereof. The air-guiding element 130 thus pivots upwardly as a whole, and therefore the airflow is guided upwards.

A suitable coupling rail (not illustrated in greater detail) between various air-guiding elements 130 visible for example in FIG. 2 ensures that all air-guiding elements 130 provided also participate in this movement.

It should be noted at this juncture that the fork of the coupling 136 has sufficient clearance as considered to the left and right in the direction 112, such that a decoupling of the fork-shaped coupling 136 in the direction 112 from the handle 108 is provided. This means that a displacement of the handle 108 in the direction 112 leaves the position of the fork-shaped coupling 136 uninfluenced. The horizontal and vertical airflow directions can thus be adjusted independently of one another.

As already mentioned above, the air outlet 100 also has the possibility to adjust the intensity of the airflow exiting from the air outlet side 104. For this purpose said rotary element 110 is provided on the operating element 106. The lever-like rotary element 110 engages via the end thereof remote from the air outlet opening, that is to say the end that is also remote from the handle 108, with a slot-like recess 140 of a coupling 138. In the slot-like recess 170 the rotary element has a mechanical decoupling relative to the coupling 138 as considered in the direction of rotation with respect to the axis 114. In other words, if the handle and therefore the rotary element 110 are rotated together about the axis 114, merely the end of the rotary element remote from the air outlet opening slides back and forth in the slotted link guide 140, however this does not lead to a transmission of force, in particular in the direction 112 between the rotary element 110 and coupling 138.

If, however the rotary element 110 is rotated about the pivot point 116, this causes the end of the rotary element engaging with the slotted link guide 140 to exert a force in the direction 112 onto the coupling 138.

Figure 3:
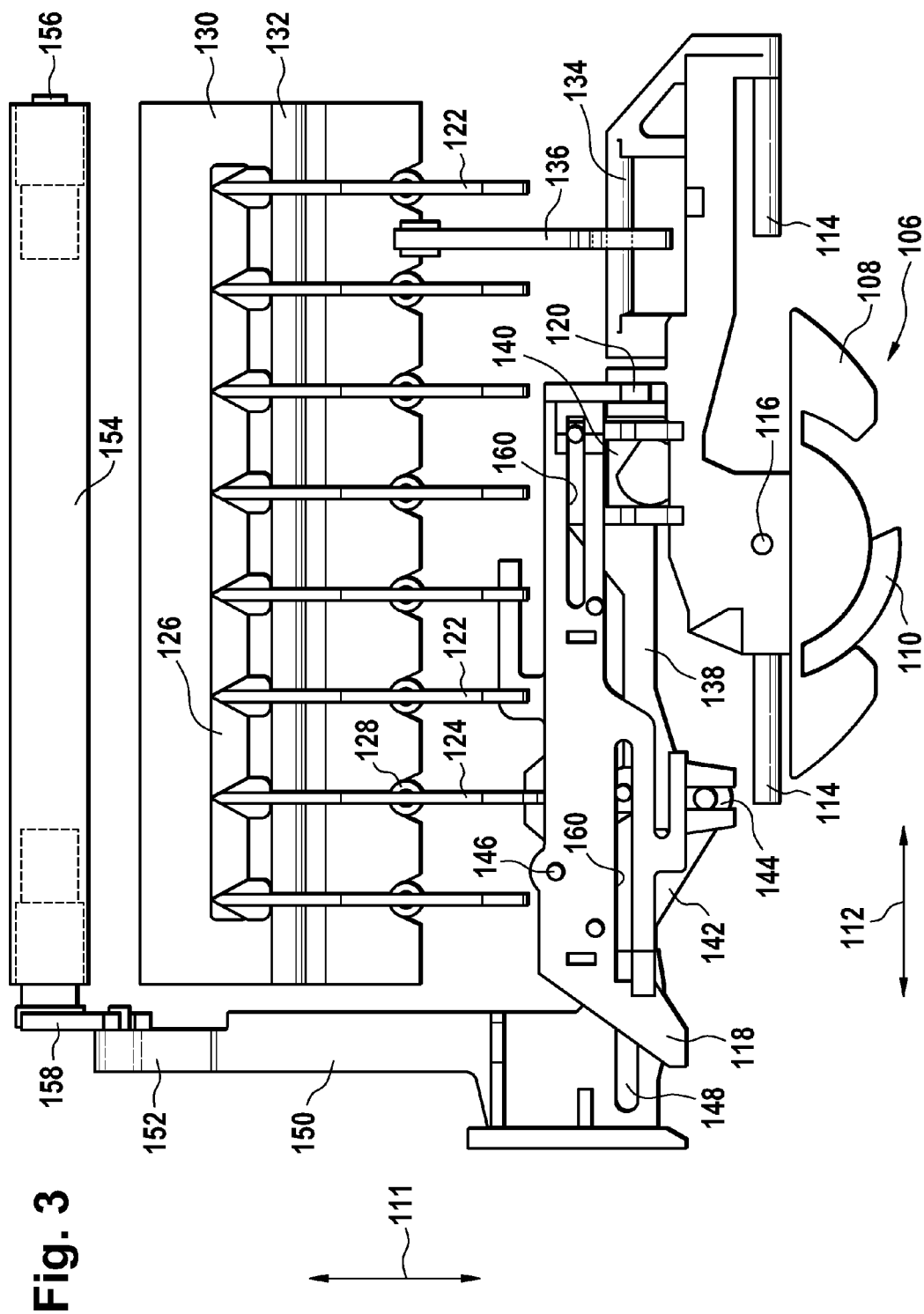
FIG. 3 shows a plan view of the air outlet of FIG. 1.

Thus, if in the example of FIGS. 2 and 3 the rotary element 110 is rotated about the pivot point 116 in an anticlockwise direction this then (with positioning of the handle 108 uninfluenced thereby) causes the coupling 138 to be moved to the left in the direction 112. A lever 142 is now additionally hinged to the coupling 118 at the lever pivot point 146. The lever 142 is also mechanically connected to the coupling 138. This mechanical connection is realised here via a further slotted link guide 144. In the example of FIGS. 2 and 3 the coupling 138 has a slot-like elongate recess, which runs in a plane perpendicular to the direction 112. An axis of the lever 142 pointing in the vertical direction engages with this slot of the slotted link guide 144. Due to the pivot point 146 and the connection of the lever 142 to the coupling 138 via the slotted link guide 144, a displacement of the coupling 138 to the left results in a rotation of the lever 142 in a clockwise direction about the pivot point 146.

Via its end remote from the slotted link guide 144, the lever 142 also engages with a recess 148 of a force transmission element 150, said recess running in the direction 112. This recess 148 initially ensures that the force transmission element 150 and the lever 142 are mechanically decoupled from one another with respect to a movement in the direction 112.

This means that a movement of the handle 108 in the direction 112 has no mechanical influence on the force transmission element 150. Only if the rotary element 110 is rotated about the pivot point 116 does this lead to a corresponding rotation of the lever 142. Due to this rotation of the lever 142, the force transmission element experiences a force in the direction 111. The direction 111 is perpendicular here to the direction 112 and points from the air outlet direction to the air inlet direction.

The force transmission element 150 is mechanically connected via an end 152 to closure elements 154 of the air outlet. The closure elements 154 can be rotated about an axis 156 likewise pointing in the direction 112. Depending on the position of the closure elements 154, this leads either to a release of the air inlet 102 for the inflow of air into the air-guiding element or to a closure of the inlet side 102. Positions between these two extreme positions enable the adjustment of the intensity of the airflow flowing out from the air outlet opening 104.

The axis 156 is connected rigidly to the closure element 154. A lever 158 is likewise connected rigidly to the axis 156. Via one end thereof the lever 158 is thus connected to the axis 156, and via the other end thereof the lever 158 engages with a further slotted link guide, which for the sake of clarity is not shown in greater detail in FIGS. 2 and 3 and is located at the end 152 of the force transmission element 150.

A displacement of the force transmission element 150 in the direction 111 thus causes a force to be exerted onto the lever 158 and for this reason the axis and therefore the closure element 154 are rotated.

In the special embodiment of FIG. 2 the end 152 is T-shaped or V-shaped. It is thus possible to actuate the closure elements 154 simultaneously.

To summarise, a movement of the rotary element 110 for example to the right causes the coupling 138 to be displaced to the left, since the lever 142 rotates in a clockwise direction and thus in turn exerts a force in the direction of the air inlet opening onto the force transmission element 150. This causes a corresponding rotation of the axis 154 and therefore a movement of the closure element 154.

The movement of the rotary element 110 here has no influence on the position of the air-guiding elements 130 and 122. Two slots 160 of the coupling 118, said slots pointing in the direction 112, guide the coupling 138 and mechanically decouple the coupling 138 and coupling 118 in relation to a movement in the direction 112 for the case that the rotary element 110 is rotated about the pivot point 116. If, by contrast, the handle 108 is displaced in the direction 112, this thus leads to a joint displacement of the coupling 118 and coupling 138 in the direction 112 on account of the axis 120.

On the whole, the complete operation of the air outlet 100 can be performed using a single operating element 106 and the handle 108 integrated herein with rotary element 110 in a comfortable manner. By means of a single operating element 106, it is thus possible to implement all three areas of air guidance, that is to say to the right/left, up/down and closure, simultaneously. The air outlet can be produced in a compact manner and can be operated easily. Any movement with respect to the three-dimensional adjustment of the airflow and the adjustment of the intensity of the airflow is devoid of any mutual influencing in the event of the respective adjustment.

LIST OF REFERENCE SIGNS 102 air inlet side
104 air outlet side 106 operating element
108 handle
110 rotary element
111 direction
112 direction
114 axis
116 pivot point
118 coupling
120 axis
122 air-guiding element
124 lever
126 coupling rail
128 pivot point
130 air-guiding element
132 axis
134 axis
136 coupling
138 coupling
140 slotted link guide
142 lever
144 slotted link guide
146 pivot point
148 recess
150 force transmission element
152 end of the force transmission element
154 closure element
156 axis
158 lever
160 recess

What is claimed is:

1. An air outlet comprising:
a housing;
an operating element arranged on the visible side of the air outlet;
a first air-guiding element; and
a closure element,
wherein the operating element has a handle and a rotary element, wherein a pivot point of the rotary element is arranged on the handle, wherein the rotary element is mechanically coupled to the closure element via a first coupling which is linearly movable in order to adjust the intensity of air that can flow out from the air outlet, wherein the handle can be displaced linearly in a first direction and is mechanically coupled to the first air-guiding element via a second coupling in order to adjust an outflow direction of the air that can flow out from the air outlet, wherein the outflow direction lies in a first plane having the first direction, wherein the first coupling is pivotably connected to a first lever, wherein a pivot point of the first lever is arranged on the second coupling, wherein the second coupling is pivotably coupled with a second lever, and wherein a pivot point of the second lever is arranged on the air outlet in a manner fixed on the housing, wherein the operating element can be adjusted independently of the first air guiding element.

2. An air outlet comprising:
a housing;
an operating element arranged on the visible side of the air outlet;
a first air-guiding element; and
a closure element,
wherein the operating element has a handle and a rotary element, wherein a pivot point of the rotary element is arranged on the handle, wherein the rotary element is mechanically coupled to the closure element via a first coupling in order to adjust the intensity of air that can flow out from the air outlet, wherein the handle can be moved in a first direction and is mechanically coupled to the first air-guiding element via a second coupling in order to adjust an outflow direction of the air that can flow out from the air outlet, wherein the outflow direction lies in a first plane having the first direction, wherein the first coupling is operatively connected to a first lever, wherein a pivot point of the first lever is arranged on the second coupling, wherein the second coupling has a second lever, and wherein a pivot point of the second lever is arranged on the air outlet in a manner fixed on the housing, and
wherein an axis of rotation of the rotary element is perpendicular to the first direction.

3. The air outlet according to claim 1, wherein the second coupling can be displaced via the handle in the first direction, wherein the second coupling and the handle are mechanically coupled to one another via a first axis pointing in the first direction and are rotatable relative to one another about the first axis.

4. The air outlet according to claim 1, wherein the first coupling and the first lever are mechanically coupled to one another via a first slotted link guide, wherein the first lever and the first coupling are rotatable relative to one another in the first slotted link guide.

5. An air outlet comprising:
a housing;
an operating element arranged on the visible side of the air outlet;
a first air-guiding element; and
a closure element,
wherein the operating element has a handle and a rotary element, wherein a pivot point of the rotary element is arranged on the handle, wherein the rotary element is mechanically coupled to the closure element via a first coupling in order to adjust the intensity of air that can flow out from the air outlet to form a mechanical coupling, wherein the handle can be moved in a first direction and is mechanically coupled to the first air-guiding element via a second coupling in order to adjust an outflow direction of the air that can flow out from the air outlet, wherein the outflow direction lies in a first plane having the first direction, wherein the first coupling is operatively connected to a first lever, wherein a pivot point of the first lever is arranged on the second coupling, wherein the second coupling has a second lever, and wherein a pivot point of the second lever is arranged on the air outlet in a manner fixed on the housing,
the air outlet further comprising a force transmission element for mechanically coupling the first lever to the closure element, wherein the first lever and the mechanical coupling are mechanically decoupled from one another in the first direction.

6. The air outlet according to claim 5, wherein the closure element is rotatable about a second axis pointing in the first direction in order to adjust the intensity of the air that can flow out from the air outlet, wherein the force transmission element is coupled to the closure element via a third lever, wherein the force transmission element and the third lever are mechanically coupled to one another via a second slotted link guide, wherein the third lever and the force transmission element are rotatable relative to one another in the second slotted link guide.

7. The air outlet according to claim 1, wherein the first coupling is displaceable relative to the second coupling via a third slotted link guide guiding in the first direction, wherein the third slotted link guide is formed by the first coupling and by the second coupling.

8. The air outlet according to claim 1, wherein the first coupling and the rotary element are mechanically coupled to one another via a fourth slotted link guide, wherein the rotary element and the first coupling are rotatable relative to one another in the fourth slotted link guide.

9. The air outlet according to claim 1, further comprising a second air-guiding element, wherein the handle is mounted on the housing so as to be rotatable about a handle axis, wherein the handle is displaceable via the handle axis relative to the housing in the first direction, wherein the handle axis points in the first direction, wherein the handle is mechanically coupled to the second air-guiding element via a third coupling in order to adjust the outflow direction of the air that can flow out from the air outlet, wherein the outflow direction that can be adjusted via the second air-guiding element lies in a second plane having the direction of rotation of the handle axis.

10. The air outlet according to claim 9, wherein the third coupling and the handle are mechanically coupled to one another via a fifth slotted link guide, wherein the handle and the first coupling are rotatable relative to one another in the fifth slotted link guide.

11. The air outlet according to claim 9, wherein the third coupling is hinged via a coupling axis to the second air-guiding element, wherein the coupling axis points in the first direction.

12. An instrument panel for a motor vehicle, wherein the instrument panel has the air outlet according to claim 1.

13. An instrument panel for a motor vehicle, wherein the instrument panel has the air outlet according to claim 2.

14. An instrument panel for a motor vehicle, wherein the instrument panel has the air outlet according to claim 3.

15. An instrument panel for a motor vehicle, wherein the instrument panel has the air outlet according to claim 4.

16. An instrument panel for a motor vehicle, wherein the instrument panel has the air outlet according to claim 5.

17. An instrument panel for a motor vehicle, wherein the instrument panel has the air outlet according to claim 7.

18. An instrument panel for a motor vehicle, wherein the instrument panel has the air outlet according to claim 8.

19. An instrument panel for a motor vehicle, wherein the instrument panel has the air outlet according to claim 9.

20. The air outlet according to claim 2, wherein the second coupling can be displaced via the handle in the first direction, wherein the second coupling and the handle are mechanically coupled to one another via a first axis pointing in the first direction and are rotatable relative to one another about the first axis.

21. The air outlet according to claim 10, wherein the third coupling is hinged via a coupling axis to the second air-guiding element, wherein the coupling axis points in the first direction.

* * * * *